United States Patent [19]

Brazel

[11] Patent Number: 4,916,461

[45] Date of Patent: Apr. 10, 1990

[54] ANTENNA WINDOW COVER

[75] Inventor: James P. Brazel, Berwyn, Pa.

[73] Assignee: General Electric Company, Philadelphia, Pa.

[21] Appl. No.: 379,683

[22] Filed: Jul. 13, 1989

Related U.S. Application Data

[63] Continuation of Ser. No. 133,471, Dec. 15, 1987, abandoned.

[51] Int. Cl.$^4$ .......................... H01Q 1/42; B32B 5/12

[52] U.S. Cl. ..................................... 343/872; 428/113

[58] Field of Search ................ 343/872, 873; 428/113, 428/114, 297

[56] References Cited

U.S. PATENT DOCUMENTS

| | | | |
|---|---|---|---|
| 4,121,002 | 10/1978 | Baldwin | 343/872 |
| 4,400,421 | 8/1983 | Stover | 428/114 |
| 4,721,645 | 1/1988 | Brazel | 428/113 |
| 4,751,135 | 6/1988 | Fenton | 428/297 |

OTHER PUBLICATIONS

Improved Boron Nitride-Boron Nitride Composite Material (N. D. Potter & T. M. Place)-Dec. 10, 1979.

*Primary Examiner*—Rolf Hille
*Assistant Examiner*—Doris J. Johnson
*Attorney, Agent, or Firm*—Allen E. Amgott; Paul Checkovich

[57] ABSTRACT

A cover for an elongated antenna window of a nose cone of a reentry type missile includes a four directional composite material. A respective portion of a plurality of fibers are disposed in each of the four directions. The directions are oriented so that the fibers provide increased resistance to expected aerodynamic pressure-induced shear forces, especially during reentry, in the plane of the longitudinal axis of the window. The fibers comprise a refractory ceramic such as silica, boron nitride, alumina, aluminum nitride or a combination thereof having a filler material including a refractory ceramic disposed in the interstices between the fibers.

19 Claims, 2 Drawing Sheets

ANTENNA WINDOW COVER

This application is a continuation of application Ser. No. 07/135,471, filed Dec. 15, 1987.

BACKGROUND OF THE INVENTION

This invention relates to a method and apparatus for protecting an antenna window and, more particularly, to a method for covering an elongated antenna window that is disposed in a nose cone of a reentrytype missile.

Present practice for covering an antenna window of a nose cone of a reentry-type missile for protecting components internal the missile employs one of two general approaches. One scheme uses a plate fabricated from a homogeneous dielectric material to cover the window. Typical dielectrics, such as monolithic ceramics, are brittle and are subject to damage due to stresses experienced during flight, especially when the missile is maneuvering during reentry. In another approach, a ground plane cover, such as may be fabricated from a carbon composite material, is disposed over the antenna window. The ground plane cover includes a plurality of discrete smaller openings having dielectric material disposed therein. An example similar to the latter is shown in U. S. Pat. No. 4,570,166 — Kuhn et al, assigned to the instant assignee, in which the solid metal wall of the nose cone is perforated to form a grid array of windows, each of which has a respective dielectric plug member fitted therein.

A four-directional (4D) triangular fiber arrangement is described in a DTIC report ADB049350 entitled "Boron Nitride — Boron Nitride Composite Material" by Potter and Place. FIG. 4 of the Potter and Place report illustrates a cylindrical configuration having three triangularly related fibers disposed in a plane perpendicular to the central axis of the cylinder and one fiber disposed in a plane parallel to the central axis of the cylinder. This orientation of the Potter and Place 4D fiber arrangement provides rigidity against the curve of the cylindrical material being flattened out, i.e. against shear in a plane perpendicular to the central axis. Although the 4D triangular fiber arrangement of Potter and Place may be used as an antenna cover, when disposed so that the one fiber is in a plane parallel to the central axis of the nose cone, there would be lower rigidity or stiffness in the plane of expected shear than that contemplated by use of the present invention, i.e. in a plane parallel to the central axis of the nose cone.

An uninterrupted 4D fiber configuration for a portion of a nose tip of a missile is described in U.S. Pat. No. 4,400,421 — Stover. Details of the structure of the nose cone 28 are not shown or described nor is an antenna window or cover shown in nose cone 28 of U. S. Pat. No. 4,400,421. The orientation of the fibers of the 4D configuration of U.S. Pat. No. 4,400,421 in a nose tip of a missile is substantially the same as that contemplated by an antenna window cover when operationally disposed in an orifice of a nose cone in accordance with the present invention.

Although at column 2, lines 55–56 of U. S. Pat. No. 4,400,421 it states that, "The 4D/3D construction is particularly adapted for use in the fabrication of nose cones," the detailed description of the use of the 4D/3D configuration at column 6, lines 3–19, clearly indicates that it is the nose tip which includes the 4D/3D configuration that may then be attached to the nose cone as described at column 5, lines 37–40.

For applications contemplated by the present invention, a large antenna window aperture is generally longer than it is wide, such as oval or elliptical, and may have an aspect ratio of at least about 1.5 to 1 with the longer axis disposed substantially along a meridian of the surface of the nose cone and the shorter axis perpendicular or transverse thereto. In an operational environment, and especially while maneuvering during the reentry phase of flight, shear stresses along the longer axis tend to be greater than along the shorter axis and thus it would be desirable to provide an antenna window having more structural material for support in the long axis than in the short axis of the elongated window.

Accordingly, it is an object of the present invention to provide a method for disposing more structural reinforcement fiber material for support in an expected plane of higher shear of a composite material cover for an elongated antenna window.

Another object of the present invention is to provide a method for protecting the environment interior a cavity of a nose cone of a missile.

Still another object is to provide a cover for an elongated antenna window of a nose cone wherein the cover includes greater reinforcement along the longer axis than the shorter axis.

SUMMARY OF THE INVENTION

In accordance with the present invention, a cavity disposed internal a structure having an external aerodynamic surface and an aperture coupled to the cavity and terminating at an elongated orifice in the external surface, wherein the aperture forms an electromagnetic flow communication path between the cavity and surroundings external the structure, are protected by a method including disposing a dielectric material having a four directional design over the aperture for sealingly engaging the orifice. The dielectric material, which may include a refractory ceramic such as silica, alumina, boron nitride, aluminum nitride or a combination thereof, includes a plurality of fibers. A respective portion of the plurality of fibers is disposed in each of the four directions so that more fibers and additional resistance to expected aerodynamic pressure-induced shear are provided in planes parallel to the longitudinal axis as opposed to the axis transverse the longitudinal axis. For example, one portion of the fibers is disposed in a first plane and direction parallel to the longitudinal axis while a second and third portion are disposed in respective second and third planes parallel to and on opposite sides of the first plane. The second and third portion are further disposed in respective second and third directions, the second direction skew the first direction and the third direction skew the first direction opposite the second direction. The fourth portion is disposed in a fourth plane perpendicular the first direction and in a fourth direction perpendicular the first plane.

Preferably the orifice is substantially oval having an aspect ratio of at least 1.5 to 1 and may be disposed in a missile nose cone. Additionally, filler matrix material including a refractory ceramic, such as the same that constitutes the fibers, may be disposed in interstices among the plurality of fibers for supporting the plurality of fibers. Also a repeatable unit cell including a respective portion of fibers respectively disposed in each of the four directions in each of the four planes may be stacked and abutted to configure a protective article for the aperture. In some cases, a fifth plane parallel to the first plane and a fifth direction parallel to the first direction may be recited for a cell so that proper registration is obtained when a plurality of cells are abutted and stacked. However, the design configuration of the resulting fiber orientations is still considered a four-directional composite.

In accordance with another aspect of the present invention, a nose cone of a reentry-type missile comprises a structure having an aerodynamic external surface, cavity means disposed within the structure for accommodating electronic components, aperture means coupled to the cavity means and terminating at the external surface of the structure, and cover means coupled to the structure. The aperture means is for forming an electromagnetic flow communication path between the cavity and the surroundings external the structure. The cover means includes a four directional composite material that engages the aperture means for protecting the environment of the cavity means from the surroundings external the structure. The four directions are appropriately disposed so that resistance to expected shear forces is provided. Electromagnetic flow communication between the surroundings external the structure and the cavity means is maintained through the cover means.

The features of the invention believed to be novel are set forth with particularity in the appended claims. The invention itself, however, both as to organization and method of operation, together with further objects and advantages thereof, may best be understood by reference to the detailed description taken in connection with the accompanying drawing.

DETAILED DESCRIPTION

Figure 1:
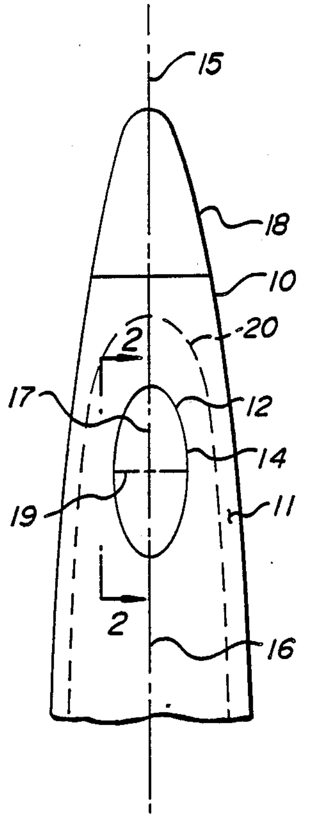
FIG. 1 is a plan view of a portion of reentry-type missile having an antenna window and cover disposed in the nose cone of the missile in accordance with the present invention.

Referring to FIG. 1, a plan view of a portion of a reentry-type missile in accordance with the present invention is shown. Nose cone 10, having a generally aerodynamic, such as conical, outer surface 11 and central axis 15, includes an elongated window, or aperture, 12 having a cover 14 sealingly engaging the margin thereof. Nose tip 18 is disposed forward nose cone 10. Window 12 facilitates electromagnetic flow communication between a hollow volume, or cavity, 20 disposed within nose cone 10 and the surroundings external nose cone 10. Window 12 may be oval or elliptical with longer axis 17 disposed coincident with a meridian 16 on surface 11, or alternatively disposed substantially parallel to central axis 15. Shorter axis 19 is perpendicular or transverse longer axis 17. Of course, window 12 may be disposed in a lateral surface of any portion of the missile, which includes any circumferential position about central axis 15. If the radius of curvature of surface 11 is large with respect to the dimension of shorter axis 19, then cover 14 may be substantially planar.

Typically, electronic equipment (not shown) such as a radio frequency (RF) antenna, RF receiver and/or RF transmitter, and guidance and control electronics, may be disposed in cavity 20. These electronic components tend to be fragile and must be protected during the course of missile flight, while still permitting undistorted and adequate uni- or bilateral electromagnetic flow through oblong aperture 12.

For cases when the missile is maintained in a preferred orientation or attitude (i.e. predetermined roll, pitch and yaw) and is not rotating, so that the focal axis of a nose cone antenna (not shown) through window 12 may be directed in a predetermined direction, like toward a passive terrestial, or perhaps a stellar or solar, reference, expected mechanical forces on window cover 14 may be readily determined. On the reentry portion of a trajectory, aerodynamic pressure loads will be exerted on window 14 which will generally be found on the earthward side (i.e. facing earth) of the missile when a passive terrestial reference is used. The magnitude of the aerodynamic loading on the window may be reduced by flying the missile at angle of attack so that the window side is leeward of the apparent wind. Especially while maneuvering during reentry to obtain the desired attitude, missile nose cone 10, including cover 14, is subjected to bending and shear stresses, including expected aerodynamic pressure-induced shear stresses. These stresses exerted on cover 14 tend to be greater along long axis 17 than along short axis 19. Accordingly, in accordance with the present invention, cover 14 is fabricated for supplying more resistance to the stresses acting along axis 17 and in the plane of expected shear than along axis 19, while still permitting electromagnetic flow communication through window 12 and cover 14.

Figure 2:
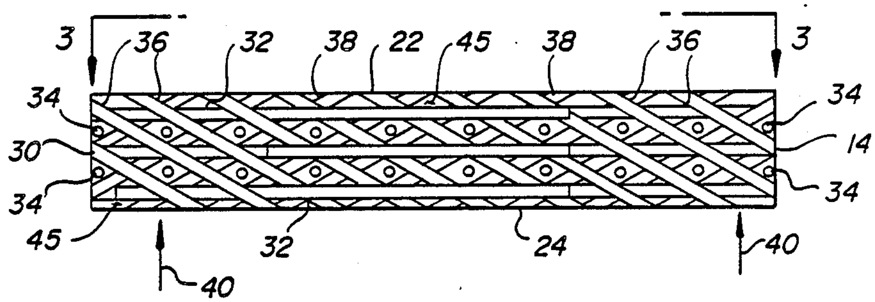
FIG. 2 is an enlarged view of the antenna window cover of FIG. 1 looking in the direction of the arrows of line 2—2 of FIG. 1.

Referring to FIG. 2, an enlarged view of cover 14 looking in the direction of the arrows of line 2—2 of FIG. 1 is shown.

Cover 14 comprises a four-directional (4D) orthotropic reinforcement design 30 for a composite material. A respective plurality of elements, or fibers, 32, 34, 36 and 38, each disposed is a respective predetermined direction, of design 30 are shown schematically in FIGS. 2–4. Elements 32, 34, 36 and 38 are disposed between substantially parallel outer face 22 and inner face 24 of cover 14. Faces 22 and 24 are formed by the ends of fiber elements 36 and 38 and a filler material 45 and are further spaced apart for defining the thickness of cover 14. Also shown is a representative plane of expected shear indicated by arrows 40, that is generally parallel to long axis 17 (FIG. 1) and substantially perpendicular to faces 22 and 24.

The plane of expected shear indicated by arrows 40 may also be considered to be generally parallel to the plane containing meridian 16 (FIG. 1) and central, or longitudinal, axis 15.

When cover 14 is viewed from the side as in FIG. 2, it is noted that elements 36 and 38 are obliquely disposed with respect to faces 22 and 24 and in substantially opposite directions with respect to each other. Elements 36 and 38 are further disposed in respective alternating, spaced apart, parallel planes having elements 32 respectively disposed therebetween. When supported by filler material 45, elements 36 and 38 form a truss-like structure for withstanding shear in planes parallel to plane 40.

Elements 34 are disposed in planes perpendicular to the planes of elements 36 and 38 while elements 32 are disposed in planes parallel to and interspersed between the planes of elements 36 and 38. Thus, elements 32, 36 and 38 lie in a plane of expected shear. Further, the matrix of reinforcement elements 32, 34, 36 and 38 is maintained in fixed spatial relationship by rigidized filler material 45.

Elements 32, 34, 36 and 38 may each comprise a dielectric material such as a refractory ceramic of which silica, alumina, boron nitride and aluminum nitride are exemplary. Further, each of elements 32, 34, 36 and 38 may comprise a single fiber or a respective plurality of fibers forming a fiber bundle.

Filler material 45 for the matrix of elements 32, 34, 36 and 38 of cover 14 comprises a dielectric substance such as a refractory ceramic which is compatible with each of elements 32, 34, 36 and 38. Typically, filler material 45 and each of elements 32, 34, 36 and 38 comprise the same substance.

Although the cross sectional shape of elements 32, 34, 36 and 38 is not especially critical, it may conveniently be round or hexagonal. Outer surface 22 of cover 14 may be contoured for obtaining an aerodynamic surface profile that provides a smooth transition with the surface of nose cone 10 contiguous the margin of orifice 12 when cover 14 is disposed in its operational environment.

Generally cover 14 may be fabricated by forming a billet (not shown) having the desired orientation of elements 32, 34, 36 and 38 and densified with rigidized filler material 45 totally occupying the interstices among elements 32, 34, 36 and 38. The overall dimensions of the billet are larger than the required size of cover 14 and are reduced, such as by machining, after filler material 45 has been introduced and at least partially hardened or densified to obtain a cover 14 having the desired size and profile. Filler material may be further densified, such as by heating, if desired.

For fabricating cover 14 in accordance with the present invention, it may be helpful to recognize that cover 14 can be built up from a repeatable cell including elements 32, 34, 36 and 38. Elements 32, 36 and 38 are respectively disposed in respective first, second and third planes, the second and third planes disposed parallel to and on opposite sides of the first plane. Element 32 is disposed in a first direction wherein the first direction is substantially parallel to longitudinal axis 15 (FIG. 1) when cover 14 is operationally disposed in window 12 (FIG. 1). Further, the first direction is substantially parallel to opposing surfaces 22 and 24 of cover 14. Element 36 is disposed in a second direction oblique or skew the first direction of element 32 and element 38 is disposed in a third direction oblique or skew the first direction and opposite the second direction of element 36. Elements 32, 36 and 38 form a truss-like structure which resists bending in the expected plane of shear 40. Elements 36 and 38 may be conveniently disposed substantially perpendicular to each other and therefore respectively at about 45° with respect to element 32. Element 34 is disposed in a plane that is substantially perpendicular to the direction of element 32 and is further disposed to lie perpendicular the first plane in which element 32 is disposed.

Figure 3:
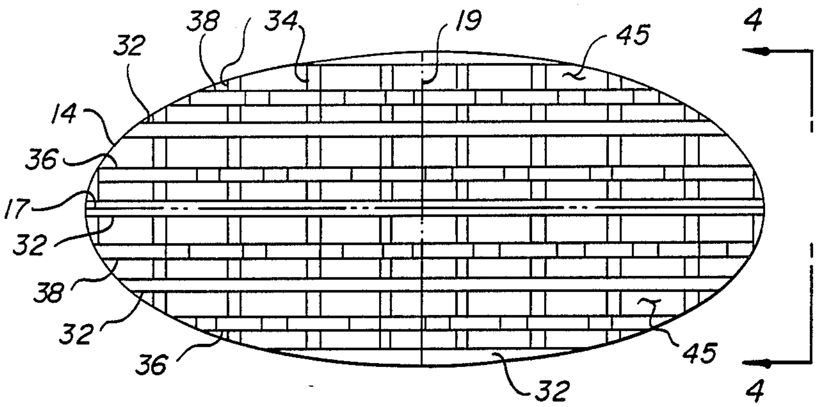
FIG. 3 is a view looking in the direction of the arrows of line 3—3 of FIG. 2.
Figure 4:
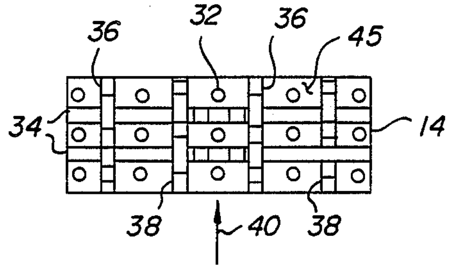
FIG. 4 is a view looking in the direction of the arrows of line 4—4 of FIG. 3.

As illustrated in FIGS. 2-4, elements 32 and 34 do not contact elements 36 and 38. However, for additional resistance to bending in shear plane 40 and for increasing overall strength, elements 32, 34, 36 and 38 may be disposed so that each of elements 32, 34, 36 and 38 abuts each of the other three elements in a tight reinforcement design 30.

Reinforcement design 30 may be strengthened and further supported by the addition of densifying material 45 to fill voids within reinforcement design 30. Material 45 is compatible with and typically comprises the same material as constitutes elements 32, 34, 36 and 38. Fine particles of material 45 may be dispersed throughout a liquid carrier or form a solution with an appropriate solvent. The solution or dispersion is directed to the voids of reinforcement design 30 and the carrier or solvent is driven off such as by heating, so that material 45 remains behind as a residue to fill the voids. Additional processing, such as further heating, may be provided, if desired, to assist bonding between elements 32, 34, 36 and 38 and material 45 and/or further to harden material 45 as is known in the art.

In certain cases, such as may be dictated by the desired orientation of the electromagnetic characteristics or pattern of antenna window 14 (FIG. 1), antenna window 14 may assume a different orientation with respect nose cone 10. For instance, shorter axis 19 may be disposed coincident with meridian 16, or alernatively be disposed substantially parallel to central axis 15 while longer axis 17 is disposed perpendicular or transverse shorter axis 19. Further, window 14 may be oriented such that shorter axis 19 and longer axis 17 are transverse or perpendicular each other while longer axis 17 is skewedly disposed at any desired angle with respect to central axis 15 or meridian 16. Regardless of the orientation of window 14, the planes of elements 32, 36 and 38 are always parallel to major axis 17 of window 14. That is, the planes of the truss-like structure are disposed parallel to the plane of expected maximum shear loading, even if the plane of expected maximum shear loading is transverse longitudinal axis 15 of nose cone 10.

Thus has been illustrated and described a method for disposing more structural material for support in an expected plane of higher shear of a cover for an elongated antenna window. Further shown and described is a cover for an elongated antenna window of a reentry-type missile nose cone wherein the cover includes greater reinforcement along the longer axis than the shorter axis and a method for protecting the environment interior a cavity of a missile nose cone.

While only certain preferred features of the invention have been shown by way of illustration, many modifications and changes will occur to those skilled in the art. It is to be understood that the appended claims are intended to cover all such modifications and changes as fall within the true spirit and scope of the invention.

What is claimed is:

1. A method for protecting the environment of a cavity, the cavity disposed internal a structure having a central longitudinal axis and an external aerodynamic surface disposed about the longitudinal axis, the external surface having a meridian, and the structure further having an aperture disposed between the external surface and the cavity, the aperture terminating at the surface in an elongated orifice and at the cavity, the aperture forming an electromagnetic flow communication path between the cavity and surroundings external to the structure, the orifice having a long axis and a shorter axis transverse the long axis, the long axis of the orifice disposed coincident with the meridian of the surface, the method comprising:

disposing a dielectric material over the aperture at the orifice, the material having a complementary contour to the orifice for sealingly engaging the margin of the orifice, wherein the material includes a plurality of fibers and further wherein a respective portion of the plurality of fibers are disposed in a repeatable cell substantially in a respective one of four directions, the cell including:

a first direction lying in a first plane, the first plane including the central longitudinal axis of the structure and the long axis of the orifice, the first direction substantially parallel to the long axis of the orifice;

a second direction lying in a second plane, the second plane substantially perpendicular to the first direction, the second direction substantially parallel to the shorter axis of the orifice;

a third direction lying in a third plane, the third plane spaced from and parallel to the first plane, the third direction oblique the first direction;

a fourth direction lying in a fourth plane, the fourth plane spaced from and parallel to the first plane and disposed on the opposite side of the first plane from the third plane, the fourth direction oblique the first direction and opposite to the third direction; and the first direction also lying in a fifth plane, the fifth plane spaced from the fourth plane and parallel to the first plane and further disposed on the opposite side of the fourth plane from the first plane;

disposing filler material including dielectric material in interstices among the plurality of fibers for supporting the plurality of fibers; and sealing engaging the margin of the orifice with filler material and fibers selected from the group consisting of fibers disposed in the first, third, and fourth directions and any combination thereof, such that elements disposed in the first, third and fourth directions also lie parallel to a plane containing the longitudinal axis and the meridian regardless of the circumferential position of the elongated orifice about the longitudinal axis of the structure.

2. The method as in claim 1, wherein the aerodynamic surface is conical.

3. The method as in claim 1, wherein the structure includes a missile nose cone and further wherein the orifice is substantially oval and has an aspect ratio of at least about 1.5 to 1.

4. The method as in claim 1, wherein the structure includes a missile nose cone and further including the step of maintaining the aperture at a predetermined attitude with respect to a predetermined passive terrestial reference when the missile is in flight.

5. The method as in claim 3, wherein the dielectric material includes a first refractory ceramic.

6. The method as in claim 5, wherein the first refractory ceramic is selected from the group consisting of silica, alumina, boron nitride, aluminum nitride and combinations thereof.

7. The method as in claim 5, wherein the filler material includes a second refractory ceramic.

8. The method as in claim 7, wherein the second refractory ceramic is selected from the group consisting of silica, alumina, boron nitride, aluminum nitride and combinations thereof.

9. The method as in claim 7, wherein the first refractory ceramic and the second refractory ceramic are the same.

10. A nose cone of a reentry-type missile comprising:

a structure having an aerodynamic external surface disposed about a central longitudinal axis of the structure, the surface having an elongated orifice, the orifice having a long axis and a shorter axis transverse the long axis, the long axis of the orifice disposed substantially parallel to the longitudinal axis of the structure and further disposed coincident with a meridian of the surface;

aperture means terminating at the orifice, the aperture means forming an electromagnetic flow communication path between the surroundings external to the structure and cavity means disposed within the missile, the cavity means for accommodating electronic components;

cover means coupled to the structure, the cover means for sealingly engaging the margin of the orifice for protecting the environment of the cavity means from the surroundings external the structure while permitting electromagnetic flow communication between the surroundings external the structure and the cavity means through the cover means, wherein the cover means includes a four directional composite dielectric material having a greater resistance to a predetermined magnitude of stress directed in the plane determined by the long axis of the orifice and the thickness direction of the cover means when coupled to the structure than to the predetermined magnitude of stress directed in the plane determined by the shorter axis of the orifice and the thickness direction of the cover means when coupled to the structure, the plane determined by the long axis disposed parallel to a plane containing the meridian and the longitudinal axis of the structure regardless of the circumferential position of the orifice about the longitudinal axis of the structure.

11. The nose cone as in claim 10, wherein the composite material includes a refractory ceramic.

12. The nose cone as in claim 11, wherein the refractory ceramic is selected from the group consisting of silica, alumina, boron nitride, aluminum nitride and combinations thereof.

13. The nose cone as in claim 10, wherein the cover means includes a plurality of fibers and further wherein a respective portion of the plurality of fibers are disposed in a repeatable cell substantially in a respective one of four directions, the cell including:

a first direction lying in a first plane, the first plane including the longitudinal axis of the structure and the long axis of the orifice, the first direction substantially parallel to the long axis of the orifice;

a second direction lying in a second plane, the second plane substantially perpendicular to the first direction, the second direction substantially parallel to the shorter axis of the orifice.

a third direction lying in a third plane, the third plane spaced from and parallel to the first plane, the third direction oblique the first direction;

a fourth direction lying in a fourth plane, the fourth plane spaced from and parallel to the first plane and on the opposite side of the first plane from the third plane, the fourth direction oblique the first direction and opposite to the third direction; and the first direction also lying in a fifth plane, the fifth plane spaced from the fourth plane and parallel to the first plane and further disposed on the opposite side of the fourth plane from the first plane.

14. The nose cone as in claim 1, wherein the orifice is substantially oval and has an aspect ratio of at least about 1.5 to 1.

15. A cover for an antenna window of a reentry-type vehicle having a longitudinal axis and a surface disposed about the longitudinal axis of the missile, the window having a longitudinal dimension and a breadth dimension transverse the longitudinal dimension, wherein the longitudinal dimension is greater than the breadth dimension and is disposed coincident with a meridian of the surface, the cover having an outer margin complementary to the contour of the window for sealingly engaging the window and further having a longitudinal axis and a breadth axis corresponding to the longitudinal dimension and breadth dimension of the window, respectively, the cover comprising:

a four-directional dielectric composite material having a repeatable unit, the unit including first, second, third and fourth elongated elements respectively disposed in respective first, second, third and fourth directions lying in respective first, second, third and fourth planes, the third and fourth planes disposed parallel to and on opposite sides of the first plane, and the second plane disposed perpendicular to the first direction, wherein the first direction is parallel the longitudinal axis of the cover, the third direction is oblique the first direction, the fourth direction is oblique the first direction and opposite the third direction, and the second direction is perpendicular the first plane such that when the cover is operationally disposed in the window elements disposed in the first, third and fourth planes also lie in the plane parallel to a plane including the meridian and the longitudinal axis of the vehicle regardless of the circumferential position of the window around the vehicle.

16. The cover as in claim 15, wherein the outer margin of the cover is oval and has an aspect ratio of at least about 1.5 to 1.

17. The cover as in claim 15, wherein the elongated elements include refractory ceramic material selected from the group consisting of silica, alumina, boron nitride, aluminum nitride and combinations thereof.

18. The cover as in claim 17, further including filler material selected from the group consisting of silica, alumina, boron nitride, aluminum nitride and combinations thereof disposed in interstices among the plurality of elongated elements for supporting at least in part the plurality of elongated elements.

19. The cover as in claim 18, wherein the filler material includes the same refractory ceramic material as the elongated elements.

* * * * *